United States Patent [19]

Suga

[11] Patent Number: 4,985,894
[45] Date of Patent: Jan. 15, 1991

[54] FAULT INFORMATION COLLECTION PROCESSING SYSTEM

[75] Inventor: Hideoki Suga, Kanagawa, Japan

[73] Assignee: Mitsubishi Denki Kabushiki Kaisha, Tokyo, Japan

[21] Appl. No.: 284,078

[22] Filed: Dec. 14, 1988

[30] Foreign Application Priority Data

Dec. 14, 1987 [JP] Japan .................. 62-315804

[51] Int. Cl.⁵ .............................. G06F 11/00
[52] U.S. Cl. ........................... 371/16.5; 371/16.1
[58] Field of Search ............. 371/16.1, 16.5, 18, 371/15.1, 29.1; 364/186, 131

[56] References Cited

U.S. PATENT DOCUMENTS

| | | | |
|---|---|---|---|
| 3,916,178 | 10/1975 | Greenwald | 371/16.1 |
| 4,031,375 | 6/1977 | Jaskulke | 371/16.1 |
| 4,549,296 | 10/1985 | Castel | 371/16.5 |
| 4,685,053 | 8/1987 | Hattori | 371/29.1 X |
| 4,713,810 | 12/1987 | Chum | 371/20.1 X |

Primary Examiner—Jerry Smith
Assistant Examiner—Robert W. Beausoliel
Attorney, Agent, or Firm—Wolf, Greenfield & Sacks

[57] ABSTRACT

A fault information collection processing system comprises a channel control unit for controlling data transmission between a central processing unit and said system, a storage unit, a line control unit, a central control unit for controlling the above component devices in said system and a service control unit for controlling collection and processing operations for fault information signals from said component devices. Said service control unit stores the collected information signals in a portion of said storage unit, and thereafter transfers these signals to said central processing unit through said channel unit.

10 Claims, 7 Drawing Sheets

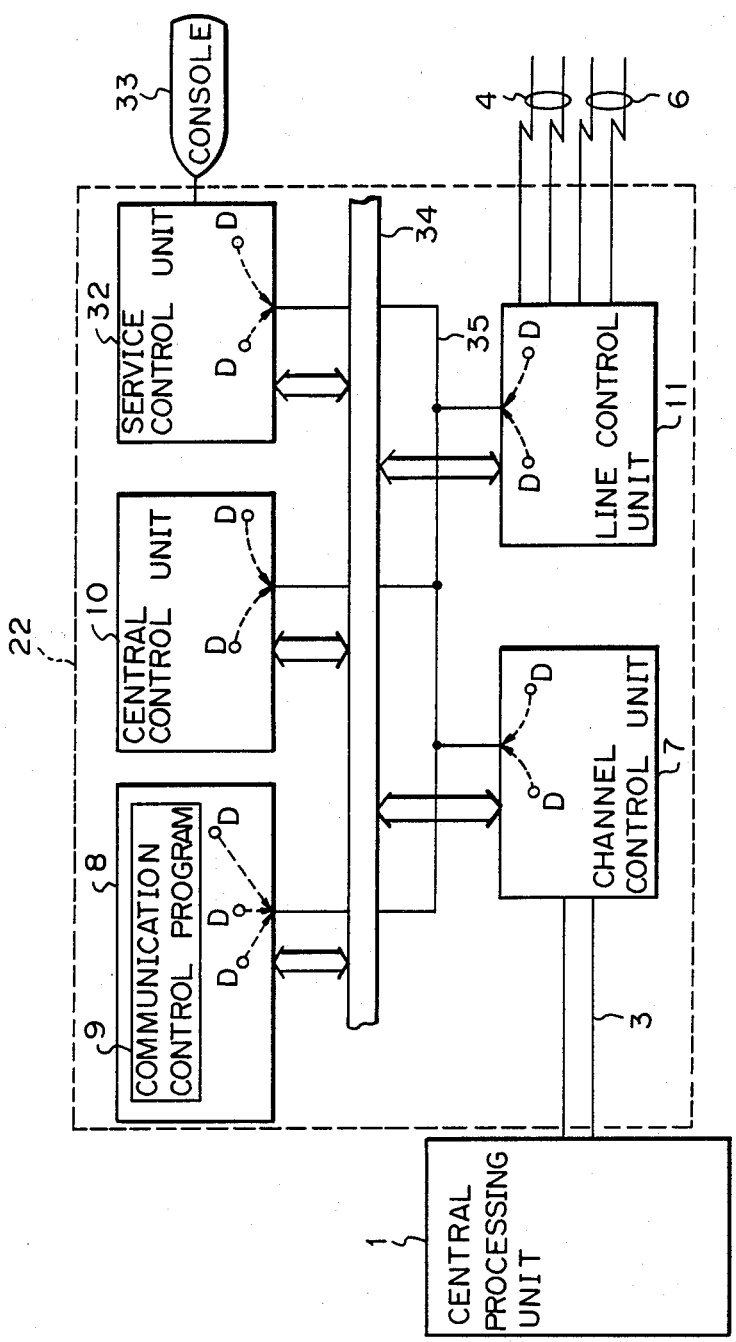

FAULT INFORMATION COLLECTION PROCESSING SYSTEM

BACKGROUND OF THE INVENTION

1. Field of the Invention

The present invention is directed to a fault information collection processing system in a program-stored communication control processing module for controlling data communication between a central processing unit and data communication lines on the basis of appropriate communication control programs.

2. Description of the Prior Art

One typical arrangement of a large scale electronic computer network in the field of sophisticated electronic computer systems involves intricate combinations of a plurality of central processing units and a multiplicity of data communication lines with decentralized processing pervading. In this type of electronic computer network, it is a widespread practice for the communication control processing module, which stores an appropriate communication control program and functions independently of the central processing unit, to be connected to an input/output channel so that there is no drop in the processing capability of the central processing unit in controlling the data communication lines, which requires a variety of transmission control procedures.

FIG. 1 illustrates a block diagram showing the configuration of an example of this type of electronic computer network. In FIG. 1, the symbols 1a through 1c designate a plurality of central processing units for performing the arithmetic and control operations required for data processing. Communication control processing units respectively indicated at 2a, 2b and 2c are connected to central processing unit 1a, 1b and 1c. The symbols 3a to 3c represent input/output channels through which central processing units 1a to 1c are connected to communication control processing units 2a through 2c. Data communication lines 2a, 2b and 2c serve to connect communication control processing units 2a through 2c to each other. Terminal units 5a, 5b and 5c are connected via terminal data communication lines 6a, 6b and 6c to communication control processing units 2a through 2c.

FIG. 2 is a block diagram depicting the internal configuration of each of the communication control units 2a to 2c depicted in FIG. 1. Referring to FIG. 2, reference numeral 2 denotes a communication control module, and 3 designates an input/output channel for connecting central processing unit 1 to communication control unit 2. Communication control module 2 functions to control input/output channel 3 so as to cause them to transfer the data between central processing unit 1 and the module 2 itself. To be more specific, communication control module 2 is composed of: a channel control unit 7 for controlling data transfer between input/output channel 3 and communication control processing module 2; a storage unit 8 for storing a communication control program 9 and the data transferred to data communication lines 4 and 6; a line control unit 11 for controlling the data transfer between data communication lines 4 and 6; and a central control unit 10 which executes communication control program 9 for the purpose of controlling channel control unit 7, storage unit 8 and line control unit 11.

We will next deal with the function of the program-stored communication control processing module. In the case of effecting data communication by use of the electronic computer defined as a destination station for the communication, the program of the central processing unit 1 depicted in FIG. 2 involves the preparation of a piece of destination information for the communication as well as a communication statement, and the data are thereby transferred and received by way of input/output channel 3 between communication control processing module 2 and central processing unit 1. The particular processing associated with the subsequent data communication is executed on the basis of communication control program 9 in communication control processing module 2. Such processing is, as a matter of fact, executed by central control unit 10 which sequentially reads commands from communication control program 9 stored in storage unit 8.

On the occasion of a data transmission from central processing unit 1 to data communication lines 4 and 6, the communication destination address and communication statement transmitted via input/output channel 3 are temporarily loaded through channel control unit 7 into storage unit 8 under the control of central control 10. Subsequently, the communication destination address is decrypted under the control of communication control program 9, and the communication statement to which transmission control characters pursuant to individual communication rules are added is transferred to line control unit 11 in transmission control procedures that are preset in the communication statement for each communication line. After a parallel/series conversion of data has been effected in line control unit 11, the data on the communication statement including the transmission control characters are sent to data communication lines 4 and 6.

In the receipt of data by central processing unit 1 from data communication lines 4 and 6, data containing the transmission control characters transmitted from data communication lines 4 and 6 undergo series/parallel conversion in line control 11. The thus converted data are then organized into a communication statement and destination information by deleting the transmission control characters under the control of communication control program 9, thereby loading such statement and information into storage unit 8. Thereafter, central control unit 10 transmits to the central processing unit 1 only the communication statement and destination information via channel control unit 7 and via input/output channel 3. It follows that, by virtue of the role played by communication control processing module 2, the central processing unit 1 is set free from such processes as identification of complicated transfer destinations and addition or deletion of control characters pursuant to the respective communication rules.

The prior art communication control processing module is, however, arranged such that the individual component devices are, as illustrated in FIG. 2, radially disposed about central control unit 10 on which the control functions of decrypting and executing communication control program 9 are concentrated. Hence, in a conventional fault information collection processing system in which certain faults occur in components of the hardware, central control unit 10 itself has to control the collection of pieces of information on each fault that occurs. It is therefore difficult to collect detailed information. On the other hand, before transferring the fault information to central processing unit 1, channel control unit 7 organizes the fault information gathered by central control unit 10 into information of several bytes. The thus organized information of several bytes is merely transferred as a hardware function of channel control unit 7 to central processing unit 1 in the form of channel-state information concomitant to the input/output operations associated with central processing unit 1. The fault information is inadequate in terms of both quality and quantity.

Speaking of the various sorts of computer systems which have been proposed of late, construction of a complicated electronic computer network involves a step of combining, as depicted in FIG. 1, a plurality of central processing units 1a, 1b and 1c with a plurality of communication control processing units 2a, 2b and 2c, respectively. The number of component devices inclusive of other input/output devices becomes extremely high and this leads to the fact that the component devices experience many kinds of faults. If rectification is based on the conventional fault information collection processing system, it is difficult to pin-point the trouble spots and to reduce the time required for restoration of normal conditions. To copy with the foregoing problems, there has been an increasing demand in recent years for a method of facilitating maintenance based on bringing together in central processing units 1a through 1c pieces of fault information relative to individual devices that combine to form a computer system and systemmatically arranging such information into easy-to-observe system fault information for use by maintenance staff. The conventional fault information collection processing system involves certain inherent problems, however, since the information transferred from communication control processing modules 2a, 2b and 2c to central processing units 1a, 1b and 1c is insufficient, and it is impossible to create accurate system fault information in central processing units 1a through 1c. Thus the above-described need has not been satisfactorily met.

SUMMARY OF THE INVENTION

It is a primary object of the present invention to obviate the foregoing problems and to provide a fault information collection processing system capable of facilitating maintenance and of allowing any faults that occur in component devices incorporated in a communication control processing module to be readily identified by a step wherein a central processing unit systematically arranges fault information into easy-to-observe fault information for use by maintenance staff as well as transferring the detailed fault information to the central processing unit.

To this end, according to one aspect of the invention, there is provided a fault information collection processing system characterized in that: a service control unit for effecting control over the collection processing of fault information serves to gather pieces of fault information and identify the component devices in which faults have occurred in any component device of a communication control processing module; the fault information is loaded in a predetermined storage region (an expanded logout region) of a storage unit; and thereafter the stored fault information is transferred via a channel control unit to a central processing unit, thus performing the collection-processing of the fault information.

BRIEF DESCRIPTION OF THE DRAWINGS

Other objects and advantages of the invention will become apparent from the following discussion in conjunction with the accompanying drawings, in which:

FIG. 3(A) is a block diagram depicting the constitution of a communication control processing module employing a fault information collection processing system representing one embodiment of the present invention.

DETAILED DESCRIPTION OF THE PREFERRED EMBODIMENTS

Figure 1:
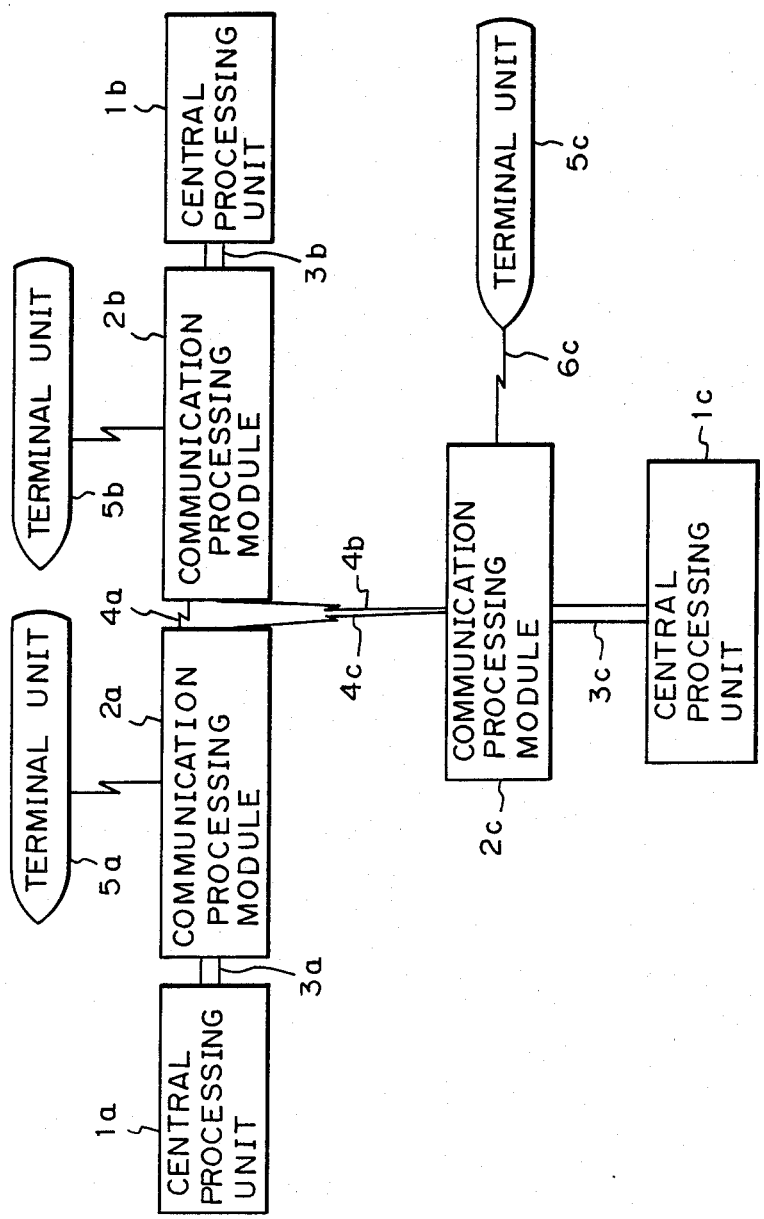
FIG. 1 is a block diagram illustrating the configuration of an electronic computer network in an example of the prior art.
Figure 2:
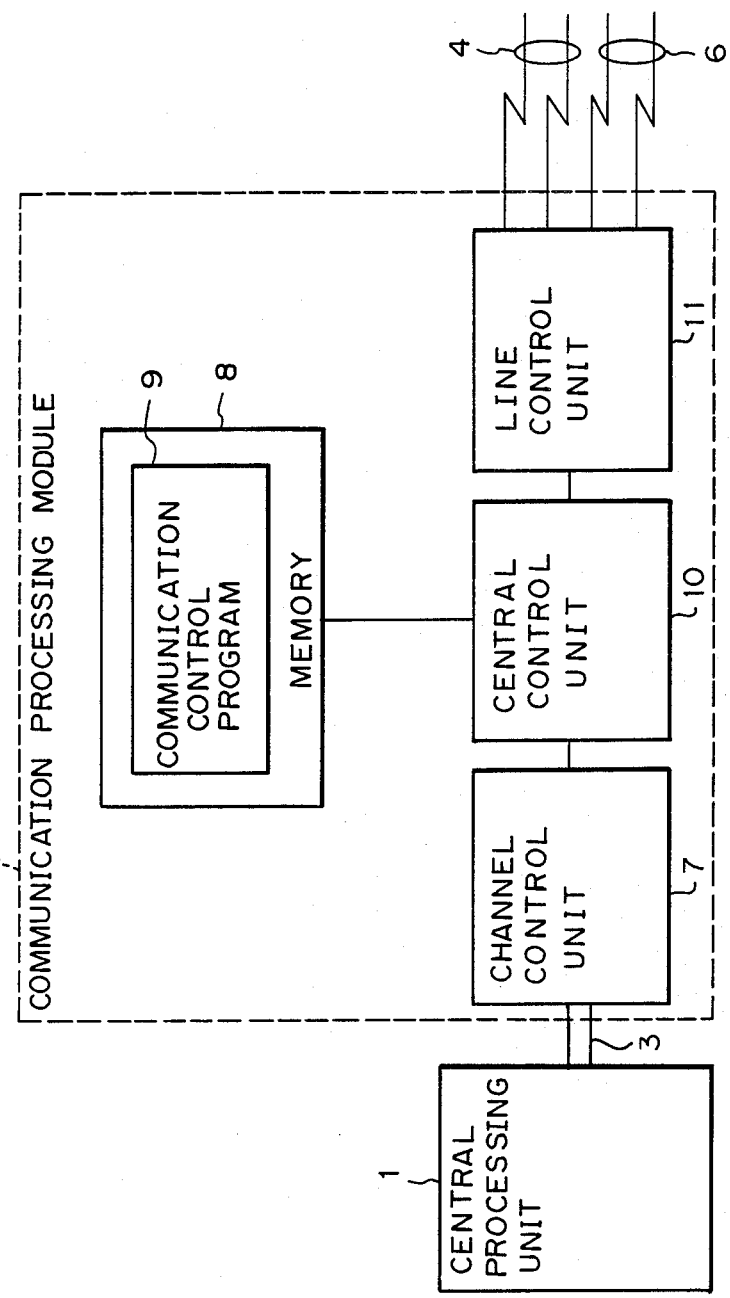
FIG. 2 is a block diagram depicting the configuration of a communication control processing module in which a conventional fault information collection processing system is utilized.

Referring first to FIG. 3(A), this is a block diagram of the constitution of a communication control processing module in which a fault information collection processing system representing one embodiment of the present invention is utilized. Components in FIG. 3(A) that correspond to those depicted in FIG. 1 are given the same symbols, and the related description is therefore omitted here. Referring again to FIG. 3(A), the numeral 32 designates a service control unit which is incorporated in a communication control processing module 22 and is adapted to effect control over collection-processing of fault information. An appropriate maintenance console generally indicated at 33 is connected to service control unit 32. Note that this console 33 is not necessarily connected to service control unit 32. The numeral 34 represents a common data bus through which a storage unit 8, a central control unit 10, a channel control unit 7, a line control unit 11 and service control unit 32 are connected. The numeral 35 denotes a signal line via which a group of operation control signals for controlling operational conditions are transmitted from service control unit 32 to storage unit 8, central control unit 10, channel control unit 7 and line control unit 11.

Figure 4:
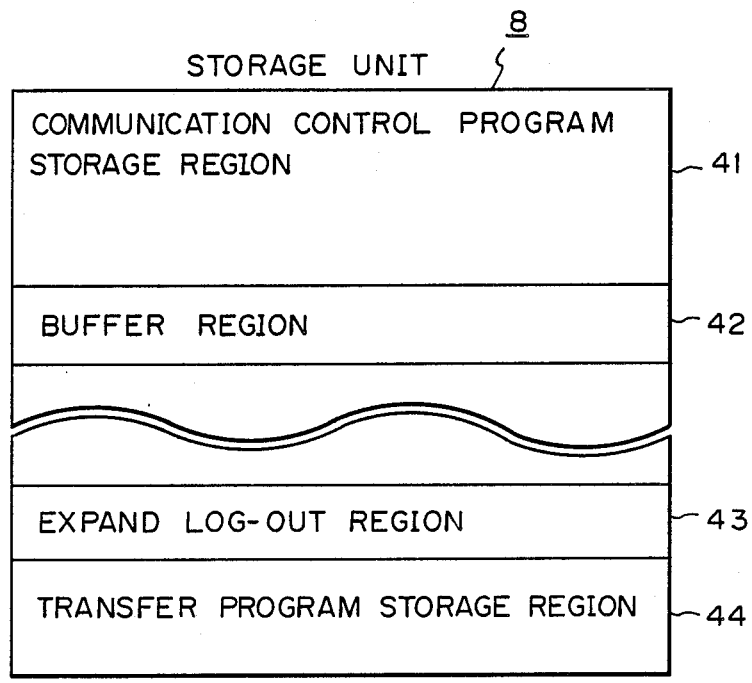
FIG. 4 is a diagram illustrating storage regions of the storage unit shown in FIG. 3(C).

FIG. 4 is a block diagram illustrating storage regions of storage unit 8 when detailed fault information in communication control processing module 22 is being transferred to central processing unit 1. In FIG. 4, the numeral 41 stands for a communication control program storage region; 42 a buffer region for data transferred and received between data communication lines 4 and 6; 43 an expanded log-out region for temporarily storing detailed fault information; and 44 a transfer program storage region for transferring the data stored in expanded log-out region 43 via channel control unit 7 as well as via input/output channel 3 to central processing unit 1.

The next part of the description will be focussed on the function of this embodiment. During normal operation, central processing unit 10 sequentially reads commands from a communication control program 9 loaded in a communication control/program storage region of storage unit 8 by way of common data bus 34, and performs processing in conformity with command instructions. When data is sent from central processing unit 1 to a variety of data communication lines 4 and 6, central control unit 10 executes a command to read in, via common data bus 34, the data transferred from central processing unit 1 through input/output channel 3 and channel control unit 7, and subsequently a command to store the thus read data in buffer region 42 of storage unit 8 through common data bus 34. In the second place, central control unit 10 decrypts a communication statement and the destination of the data stored in buffer region 42 pursuant to the instructions given by communication control program 9, and executes the command to transfer the data via common data bus 34 to line control unit 11 after adding, to the communication statement, transfer control characters based on communication rules in accordance with attributes of the predetermined data communication lines. The line control unit 11 sends out the received data to data communication lines 4 and 6 after effecting parallel/series conversion on such data.

In communcation control processing module 22, central control unit 10 performs processes reverse to the above-mentioned ones in conformity with the instructions of communication control program 9 in the case of transmitting data to central processing unit 1 after receiving data from data line communication lines 4 and 6. The transfer and receipt of the data are thus carried out between central processing unit 1 and data communication lines 4 and 6 through communication control processing module 22. Meanwhile, service control unit 32 constantly monitors the presence or non-presence of any abnormality in the component devices incorporated in communication control processing module 22.

If an abnormal condition is present in any of the component devices of communication control processing module 22, the component device in which the abnormality has been found out serves to inform service control unit 32 of the occurrence of an abnormal condition via signal line 35. Service control unit 32, informed of the abnormality in the component device of the communication control processing module through signal line 35, in turn performs control to temporarily freeze the operation of the component device of the communication control processing module through signal line 35, and then collects pieces of detailed fault information specifying the component devices experiencing the faults in question, classifying these faults and indicating their severity through common data bus 34. An internal storage region of service control unit 32 temporality stores the detailed fault information which will thereafter be loaded in expanded log-out region 43 of storage unit 8 via common data bus 34. In this case, the method of identifying the fault information involves the steps of disposing detectors D in predetermined positions of the respective component devices and detecting the fact that signals of given magnitude have been output from given detectors D on the side of service control unit 32. Detector D may probably include a temperature detector, voltage detector and current detector, or a program-runaway detector. In this instance, reference to the fault information temporarily stored in service control unit 32 can be made by means of maintenance console 33 connected to service control unit 32.

Service control unit 32 generates signals designated to initialize certain functions of the individual component devices via signal line 35 and makes preparations for resuming the operation of communication control processing module 22. At this moment, a command execution initiating address in central control unit 10 is set to the top of a transfer program storage region 44 of storage unit 8, and control is performed to allow a fault information transfer program to be executed instead of communication control program 9 when the operation is resumed, and thereafter central control unit 10 is actuated. In the wake of this step and pursuant for the instruction of the fault information transfer program stored in storage unit 8, central control unit 10 functions to coincide with the operation wherein communication control program 9 during the normal operation serves to transfer the data of buffer region 42 via channel control unit 7 and also input/output channel 3 to central processing unit 1. Central control unit 10 then transfers all the detailed fault information of expanded log-out region 43 to central processing unit 1. Hence, central processing unit 1 is capable of identifying and fixing the faulty device in communication with control processing module 22 on the basis of the detailed fault information, and is also able to output easy-to-observe detailed fault information for maintenance staff in accordance with an edit program of central processing unit 1.

Figure 3B:
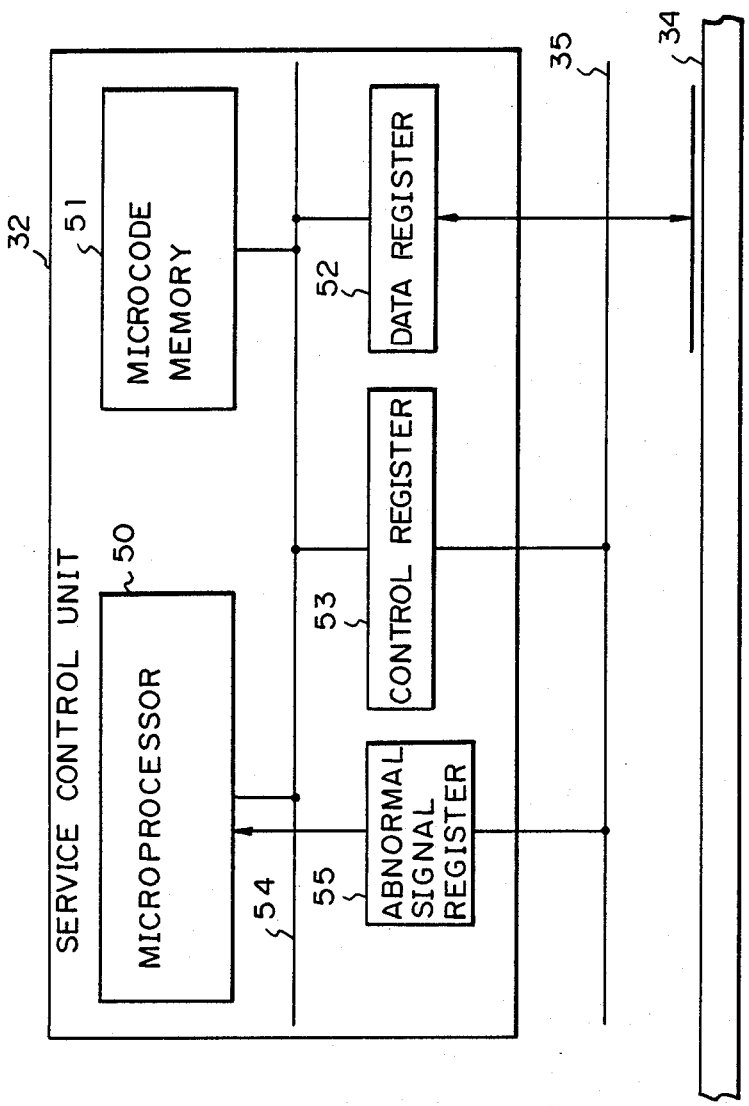
FIG. 3(B) is a block diagram depicting the internal constitution of one of the units shown in FIG. 3(A)

FIG. 3(B) is a block diagram depicting the internal configuration of the service control unit 32 illustrated in FIG. 3(A). In this figure reference numeral 50 designates a microprocessor; 51 a microcode memory adapted to store a microcode for controlling microprocessor 50; 52 a data register used for transferring data between microprocessor 50 and common data bus 34; 53 a control register for transferring and receiving signals between signal line 35 and the control register itself in order to control the operation of the communication control processing module as a whole; and 54 a data bus for connecting microprocessor 50, microcode memory 51, data register 52 and control register 53. The numeral 55 represents an abnormal signal register for holding abnormal signals from the component devices of the communication control processing module. Abnormal signal register 55 imparts an interruption request to microprocessor 50 if any abnormal condition occurs in the component device.

Figure 3C:
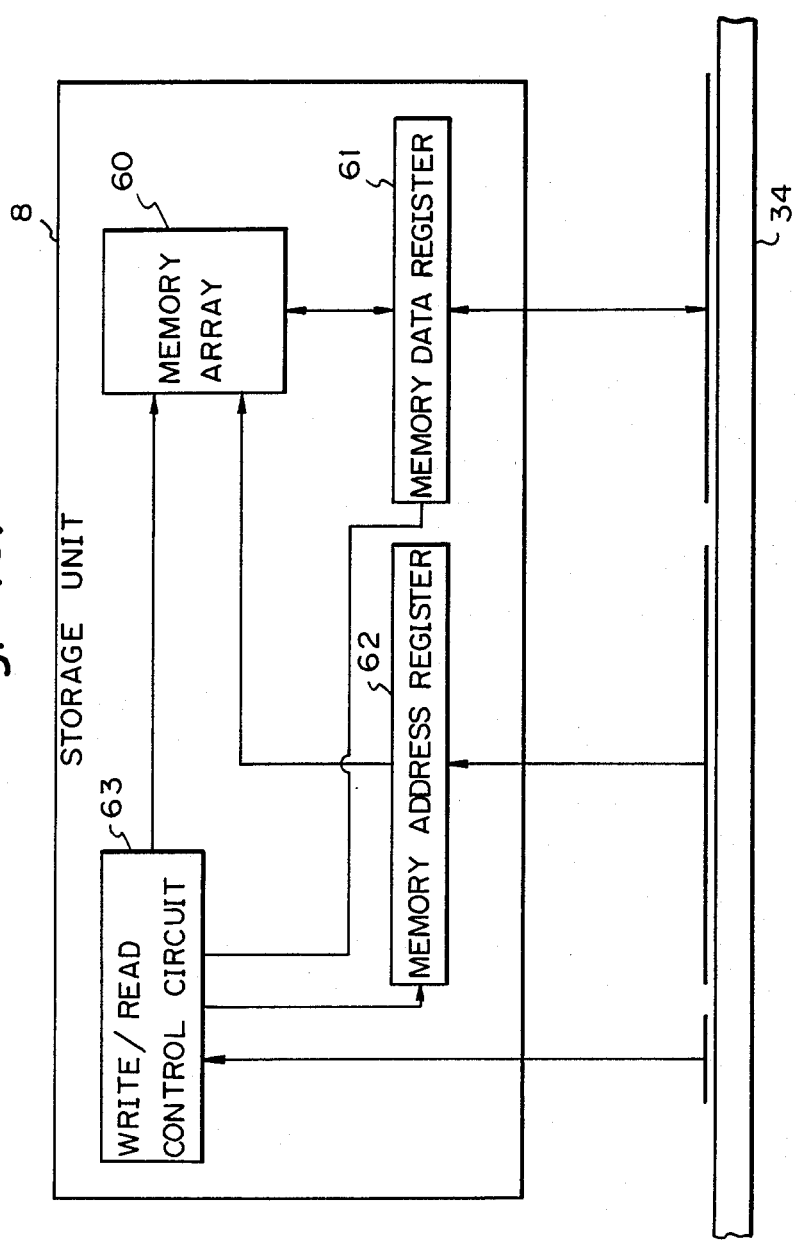
FIG. 3(C) is a block diagram showing the internal constitution of one of the units illustrated in FIG. 3(A)

FIG. 3(C) is a block diagram illustrating the internal configuration of the storage unit 8 depicted in FIG. 3(A). In FIG. 3(C) numeral 60 denotes a memory array for storing a communication control program or a transfer program; 61 a memory data register for transferring and receiving memory write-read data between common data bus 34 and memory array 60; 62 a memory address register for assigning, to memory array 60, an address for writing and reading the memory data; and 63 a memory write/read control circuit for performing control to write the data of memory data register 61 into memory array 60 in accordance with the address indicated by memory address register 62 on receiving an instruction through common data bus 34, and to read the data from the address of memory array 60, which is indicated by memory address register 62, into memory data register 61.

Figure 3D:
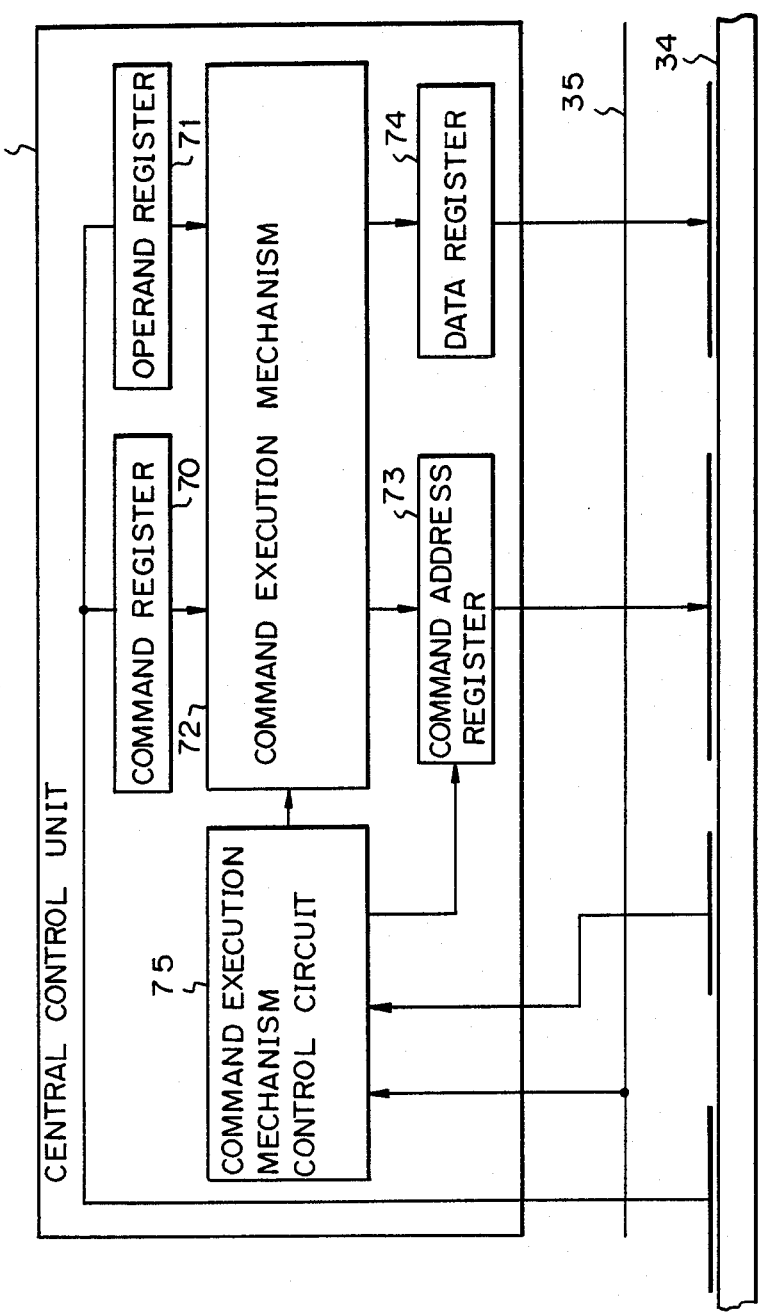
FIG. 3(D) is a block diagram depicting the internal constitution of the central control unit shown in FIG. 3(A)

FIG. 3(D) is a block diagram showing the internal configuration of the central control unit 10 shown in FIG. 3(A). In this figure numeral 70 denotes a command register for reading and holding a command from the communication control program of the transfer program stored in storage unit 8; 71 an operand register for reading and holding data which is employed for the communication control program or the transfer program stored in storage unit 8 from common data bus 34; 72 a command execution mechanism for processing the data in operand register 71 in conformity with a command code from command register 70; 73 a command address register for holding the memory address of the next command to be executed; 74 a data register used for transmitting the data obtained as a result of executing the command to common data bus 34; and 75 a common execution mechanism control circuit for controlling the start/stop of the command execution mechanism control circuit on the basis of an instruction given by service control unit 32.

The discussion now be focussed, in conjuction with FIGS. 3(A) through 3(D) and FIG. 4, on the detailed operations conducted in situations where an abnormal condition is present in communication control processing module 22; the processing of the communication control program is halted; and the fault information is transferred via channel control unit 7 and input/output channel 3 to central processing unit 1 in accordance with the transfer program.

If the abnormality appears in, e.g., line control unit 11 which is regarded as a component device of commmminication control processing module 22, line control unit 11 transmit an abnormality information signal to signal line 35. The abnormality information signal is then held by abnormal signal register 55 incorporated in service control unit 32, and an interruption takes place in microprocessor 50. Microprocessor 50 initiates the execution of an interruption processing microcode stored in a predetermined region of microcode memory 51. Based on the interruption processing microcode, microprocessor 50 sets a control signal in control register 53 for stopping central control unit 10 by way of data bus 54. The stop control signal is transmitted via common data bus 35 to command execution mechanism control circuit 75, thereby stopping the function of command exection mechanism 72 preparatory to halting execution of communication control program 9. Subsequent to this step, microprocessor 50 sets request signals for imparting information on the internal conditions of the individual component devices of communication control processing module 22 to control register 53 via data bus 54. Microprocessor 50 also performs a function of sequentially writing information sent from the respective devices into microcode memory 51 via data register 52 and data bus 54. The method adapted for selecting the devices at that time may be based on a step wherein microprocessor 50 transmits the signal for selecting each individual device to signal line 35 through control register 53, or alternatively on a step wherein pieces of information are sequentially fetched by sending addresses assigned to the respective devices to common data bus 34 through data register 52.

Microprocessor 50 takes all the information on the internal conditions of the respective devices for storage in microcode memory 51, and thereafter transfers the thus obtained information to storage unit 8. Firstly, the top address of expanded log-out region 43 of storage unit 8 is set in data register 52 via data bus 54. Secondly, the top address is transmitted to common data bus 34. A control signal transferred to and written into memory address register 62 is set via data bus 54 into control register 53. Upon transmission of the write signal of memory address register 62 through signal line 35, storage unit 8 takes the top address out of expanded log-out region 43, which is sent to common data bus 34, and supplies the same to memory address register 62 under control of write/read control circuit 63.

Microprocessor 50 subsequently reads the content of microcode memory 51 and sets the initial data of the intra-device condition information in data register 52 through data bus 54. The control signal transferred to and written into memory data resister 61 of storage unit 8 through common data bus 34 is set in control register 53 via data bus 54. Storage unit 8 takes the intra-device condition information present on common data bus 34 into memory data register 61 under control of write/read control circuit 63 upon transmitting the write signal of memory data register 61 via signal line 35. Microprocessor 50 further sets the write control signal of storage unit 8 in data register 52 by way of data bus 54, while storage unit 8 writes the content of memory data register 61 into the address specified by memory address register 62 immediately the memory write signal is transmitted via signal line 35. Microprocessor 50 advances by one step a value which is to be set in memory address register 62 and reads the next intra-device condition information from microcode memory 51. The operations discussed above are repeated till transfer of all the intra-device condition information had been completed. After transferring all the condition information which has been obtained from the respective component devices incorporated in communication control processing module 22 to expanded log-out region 43 of storage unit 8, microprocessor 50 transmits reset signals for initializing the above-mentioned component devices via data bus 54 to control register 53.

Microprocessor 50 then sets an initiation address of transfer program storageg region 44 of storage unit 8 in data register 52 by way of data bus 54. A control signal for transferring to and writing the initiation address into operand register 71 of central control unit 10 via common data bus 34 is set in control register 53 via data bus 54. Central control unit 10 operates to take the transfer program initiation address existing on common data bus 34 into operand register 71 under the control of command execution mechanism control circuit 75 upon transmitting the write signal of operand register 71 via signal line 35. Microprocessor 50 further sets a control signal for transferring the content of operand register 71 of central control unit 10 to command address register 73 in data register 52 via date bus 54. Upon transmission of the control signal via signal line 35, central control unit 10 transfers the content of operand register 71 to command address register 73 under control of command execution mechanism control circuit 75. Thereafter, microporocessor 50 functions to set an operation resuming signal of central control unit 10 in control register 53 by way of data bus 54. Immediately after the operation resuming signal has been transmitted via signal line 35, central control unit 10 reads a transfer program command from storage unit 8 pursuant to the address assigned to command address register 73, and initiates the execution thereof.

As in the case of communication control program 9, the description of the transfer program is associated with the commands of central control unit 10. Central control unit 10 sequentially reads the commands to command register 70 through common data bus 34 in conformity with the commands, thereby performing the command. The intra-device condition information stored in expanded log-out region 43 in accordance with the processing of the transfer program is read into operand register 71 via common data bus 34. The intra-device condition information is then set through command execution mechanism 72 in data register 74. The intra-device condition information of data register 74 is transferred via common data bus 34 to channel control unit 7, and is then, as in the case of the data transfer of communication control program 9, sent via input/output channel 23 to central processing unit 1. After the transfer of all the intra-device condition information has been finished, a branching command is executed pursuant to the transfer program whereby predetermined initiation address of communication control program storage region 41 is set in command address register 73, thereby reverting to the normal processing of the communication control program.

In accordance with the embodiment discussed above, the component devices of the communication control processing module include an appropriate service control unit similar to a service processing unit typically added to a sophisticated central processing unit. Whenever a fault occurs in a component device and it is thereby impossible to continue the processing of the communication control program, the service control unit collects pieces of fault information in place of the central control unit and transfers the detailed fault information to the central processing unit. This provides the following benefits. It is feasible to gather pieces of fault information pertaining to a plurality of communication control processing modules in the central processing unit. Even in a case where a fault is produced in just one of the plurality of communication control processing modules, the central processing unit is capable of identifying and fixing the faulty device without the burden of needing to gain access to the positions where the respective communication control processing modules are installed. In addition, detailed fault information can be output in an easy-to-observe form for maintenance staff in accordance with the edit program of the central processing unit. Thanks to the availability of accurate system fault information, the time needed for restitution can be reduced, and the operability during preventive maintenance is improved.

Although the illustrated embodiment of the present invention has been described in great detail with reference to the accompanying drawings, it is to be understood that the invention is not limited to this precise embodiment. Various changes or modifications may be effected by one skilled in the art without departing from the scope or spirit of the invention.

The invention will be understood more readily with reference to the following examples; however these examples are intended to illustrate the invention and are not to be construed to limit the scope of the invention.

I claim:

1. A fault information collection processing method in a program-stored communication control processing system for controlling data information between a central processing unit and data communication lines, said method comprising the steps of, generating a fault information signal from any component device in said communication control processing system in which an abnormality has been found, controlling normal operation of every component device to cause interruption thereof after receiving said fault information signal, collecting several fault information signals, storing the thus collected fault information signals in the communication control processing system, transmitting the stored fault information signals to the central processing unit, and processing the fault information signals.

2. A communication control processing system for controlling data communication between a central processing system which performs arithmetic and control operations required for data processing and data communication lines, said communication control processing system comprising a plurality of component means and having a fault information collection function, comprising:
channel control means for controlling input and output channels to transfer data between said central processing system and said data communication lines,
first storage means for storing said data, said storage means further including a region for storing a control program,
line control means for controlling transfer of data to and from said data communication lines,
central control means for controlling the operations of the component means in said communication control processing system in accordance with said control program stored in said storage means,
service control means for gathering detailed fault information from said component means and for transferring said fault information to said storage means,
said service control means comprising,
means for gathering detailed fault information from component devices in said communication control processing system,
second storage means for storing said detailed fault information, and
means for transferring said detailed fault information from said second storage means to said central processing system through said channel control means.

3. A communication control processing system as set forth in claim 2 wherein said means for gathering detailed fault information comprises a microprocessor, said service control means further comprising,
an abnormal signal register for registering abnormal signal outputs from said components means, which abnormal signal outputs represent an occurrence of a fault in the associated component means,
means, responsive to said abnormal signal outputs, for supplying a request signal to said microprocessor, and
means within said microprocessor, responsive to said request signal, for controlling the collection and storage of said fault information in said second storage means.

4. A communication control processing system as set forth in claim 3 wherein said means for transferring said detailed fault information to said central processing system comprises means for transferring said detailed fault information to said first storage means, wherein said central processing system can then retrieve said detailed fault information from said first storage means.

5. A communication control processing system as set forth in claim 4 wherein said service control means further comprises a data register for registering said detailed fault information prior to storage in said second storage means and transmission to said first storage means, and a control register for registering control signals to be transferred between said microprocessor and said central control means.

6. A communication control processing system as set forth in claim 5 further comprising a data bus for connecting said microprocessor, said second memory means, said data register and said control register, and wherein said system is embodied within a computer network, which network includes a plurality of communication control processing systems.

7. A communication control processing system as set forth in claim 2 wherein said means for gathering and said second storage means operates so as to store fault information without the processing thereof, the processing thereof occurring in said central processing system.

8. A communication control processing system for controlling data communication between a central processing system which performs arithmetic and control operations required for data processing and data communication lines, said communication control processing system having a fault information collection function, comprising:

channel control means for controlling input and output channels to transfer data between said systems, storage means for storing the data to be transferred between said systems, said storage means including a region for storing a control program, line control means for controlling input/output data from/to said data communication lines, central control means for controlling the operations of the component mans in said communication control processing system on the basis of said control program stored in said storage means, service control means for gathering detailed fault information from said component means and for transferring the gathered fault information to said storage means, wherein said service control means comprises, a microprocessor, a microcode memory storing microcodes for controlling said micro-processor, said memory having a region for storing said detailed fault information, an abnormal signal register for registering an abnormal signal output from said component means which represents an occurence of a fault in at least one of said component means, and for supplying a request signal to said microprocessor when said abnormal signal is received, whereby said microprocessor starts to control the collection of said fault information so as to store it in said region of said memory, and to control the transmission of the collected and stored fault information to said storage means.

9. A system according to claim 8 wherein said service control means further comprise a data register for registering said fault information prior to storing in said microcode memory or to transmitting to said storage means, and a control register for registering control signals to be transferred between said microprocessor and said central control means.

10. A system according to claim 8 wherein said system is used in a computer network.

* * * * *